No. 881,693. PATENTED MAR. 10, 1908.
G. JONES.
VEHICLE WHEEL.
APPLICATION FILED AUG. 16, 1906.
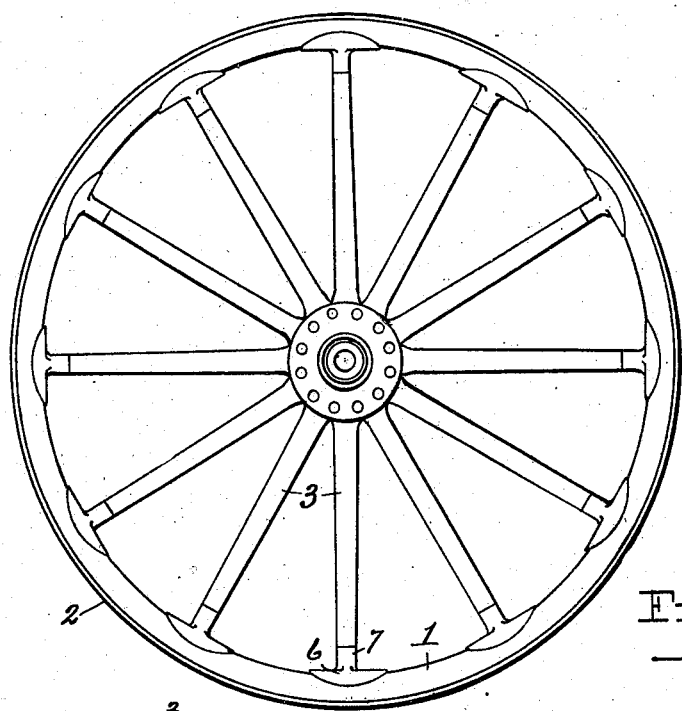
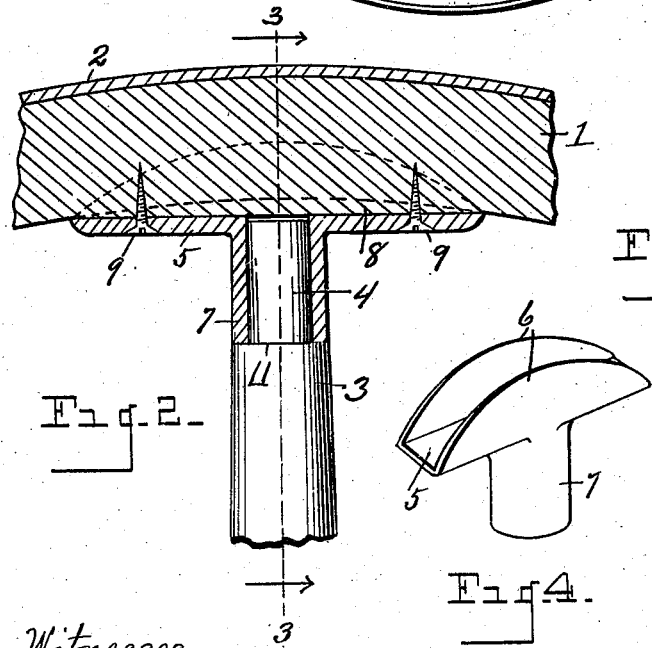
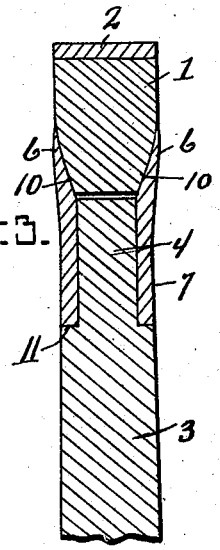
Witnesses.—
O. B. Baenziger
J. G. Howlett
Inventor.—
Gilbert Jones
By T. S. Wheeler & Co. attys

UNITED STATES PATENT OFFICE.

GILBERT JONES, OF MARION, MICHIGAN.

VEHICLE-WHEEL.

No. 881,693.  Specification of Letters Patent.  Patented March 10, 1908.

Application filed August 16, 1906. Serial No. 330,788.

*To all whom it may concern:*

Be it known that I, GILBERT JONES, a citizen of the United States, residing at Marion, in the county of Osceola, State of Michigan, have invented certain new and useful Improvements in Vehicle-Wheels; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to improvements in vehicle wheels, and consists in the construction and arrangement of parts hereinafter fully set forth and claimed.

The object of the invention is to provide simple and efficient means for joining the spokes to the felly of a wheel in a manner to obviate weakening the felly, and to effect a strong and perfect joint between the felly and spokes, the arrangement being such as to prevent the wheel getting out of shape, producing a strong and durable wheel. The above object is attained by the structure illustrated in the accompanying drawing, in which:—

Figure 1 is an elevation of a vehicle wheel embodying my invention. Fig. 2 is an enlarged fragmentary view in section, showing the manner of joining the spokes to the felly. Fig. 3 is a sectional view as on line 3—3 of Fig. 2. Fig. 4 is a perspective view of one of the socket plates employed to join the spokes to the felly.

Referring to the characters of reference, 1 designates the felly which is provided with the usual tire 2. The spokes 3 are provided with a tenon 4, but said tenon does not enter a socket in the felly, as commonly practiced; instead, I provide a socket plate 5 which rests upon the inner rim of the felly and is provided with the curved flanges 6 which embrace the felly on opposite sides, as clearly shown in Fig. 3. The plate 5 is also provided with an annular socket member 7 projecting therefrom in which is formed a socket that receives the tenon 4 of the spoke, the opening of the socket extending through the plate 5, as shown. At the point where the socket plate embraces the felly, the inner rim thereof is left straight, as shown at 8, thereby affording a flat bearing for the plate 5 and increasing the diameter of the felly at that point, whereby the felly is strengthened. Screws 9 are passed through the plate 5 into the felly to secure said plate in position. The inner faces of the flange 6 of the socket plate are beveled and the opposite sides of the inner rim of the felly are tapered, as shown at 10 in Fig. 3, thereby more firmly wedging the socket plate in place and preventing a possible spreading of the felly at the point of junction of the spoke therewith. It will be noted that the shoulder 11 on the spoke around the tenon 4 engages the upper end of the socket member 7, thereby preventing the end of the tenon jamming and bruising the felly.

By employing my improved socket plate in the manner described, the weakening of the felly by boring therein to receive the tenon of the spoke, is obviated and a superior joint is effected between the spoke and felly.

Having thus fully set forth my invention, what I claim as new and desire to secure by Letters Patent, is:—

1. In a wheel structure, the combination of a felly whose inner rim has a straight reinforced portion tapered on opposite sides, a plate seated upon said straight reinforced portion having beveled sides flanges which embrace the opposite tapered sides of the felly, and having a socket member projecting therefrom, and a spoke having a tenon which enters the socket of said member.

2. In a wheel structure, the combination of a felly reinforced in the direction of its diameter, a plate seated over said reinforced portion having flanges which embrace the opposite sides of the felly, and having a socket member projecting therefrom, a spoke having a tenon which enters the socket in said member, said spoke also having a shoulder thereon against which the end of the socket member abuts.

In testimony whereof, I sign this specification in the presence of two witnesses.

GILBERT JONES.

Witnesses:
C. T. SADLER,
E. J. HALL.